Aug. 24, 1937.　　　　　H. J. BOE　　　　　2,090,744
METHOD OF AND APPARATUS FOR MANUFACTURING AN ELECTRICAL CABLE
Filed Oct. 11, 1933　　　4 Sheets-Sheet 1

INVENTOR
H. J. BOE
BY E.R. Nowlan
ATTORNEY

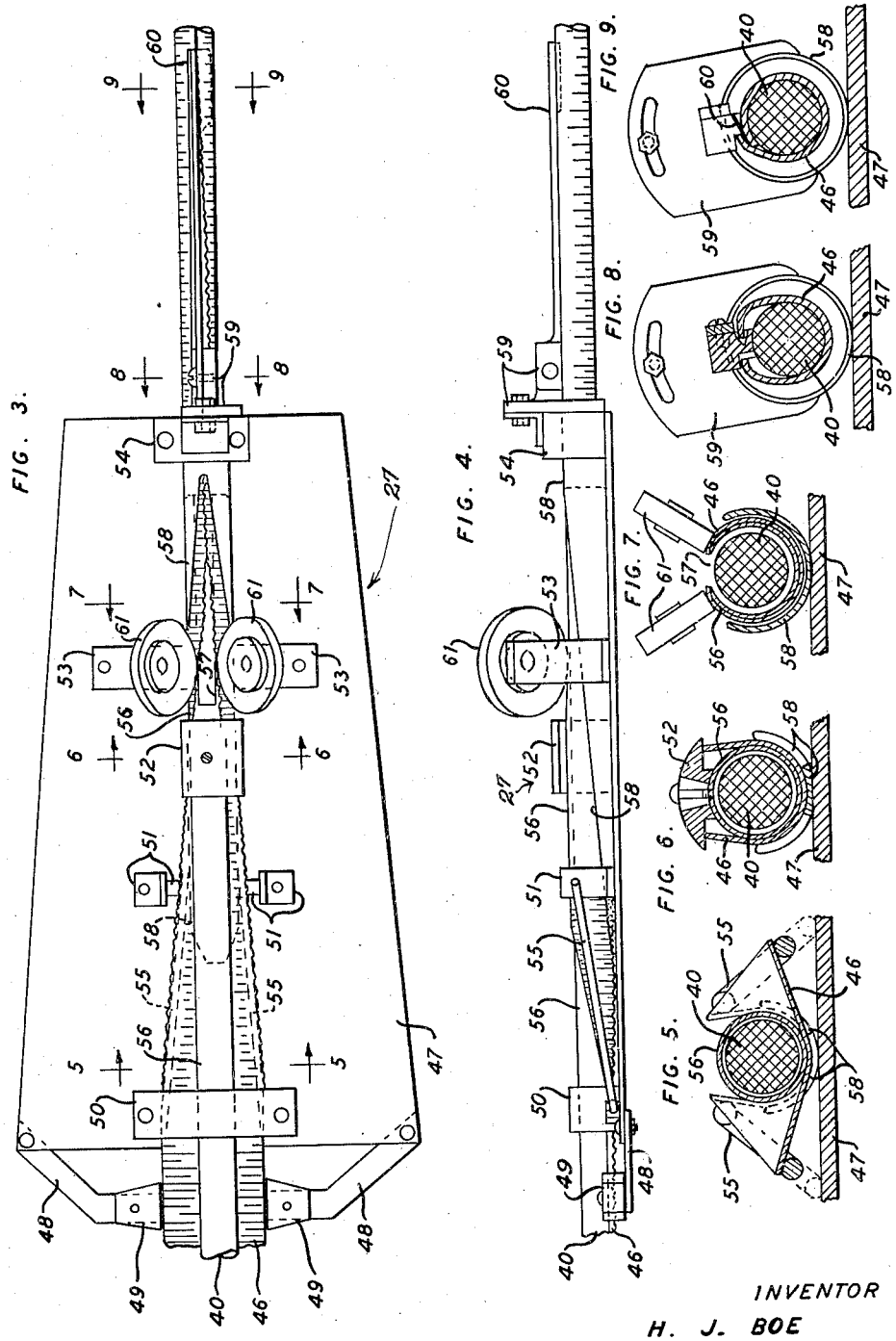

Aug. 24, 1937.  H. J. BOE  2,090,744
METHOD OF AND APPARATUS FOR MANUFACTURING AN ELECTRICAL CABLE
Filed Oct. 11, 1933  4 Sheets-Sheet 3
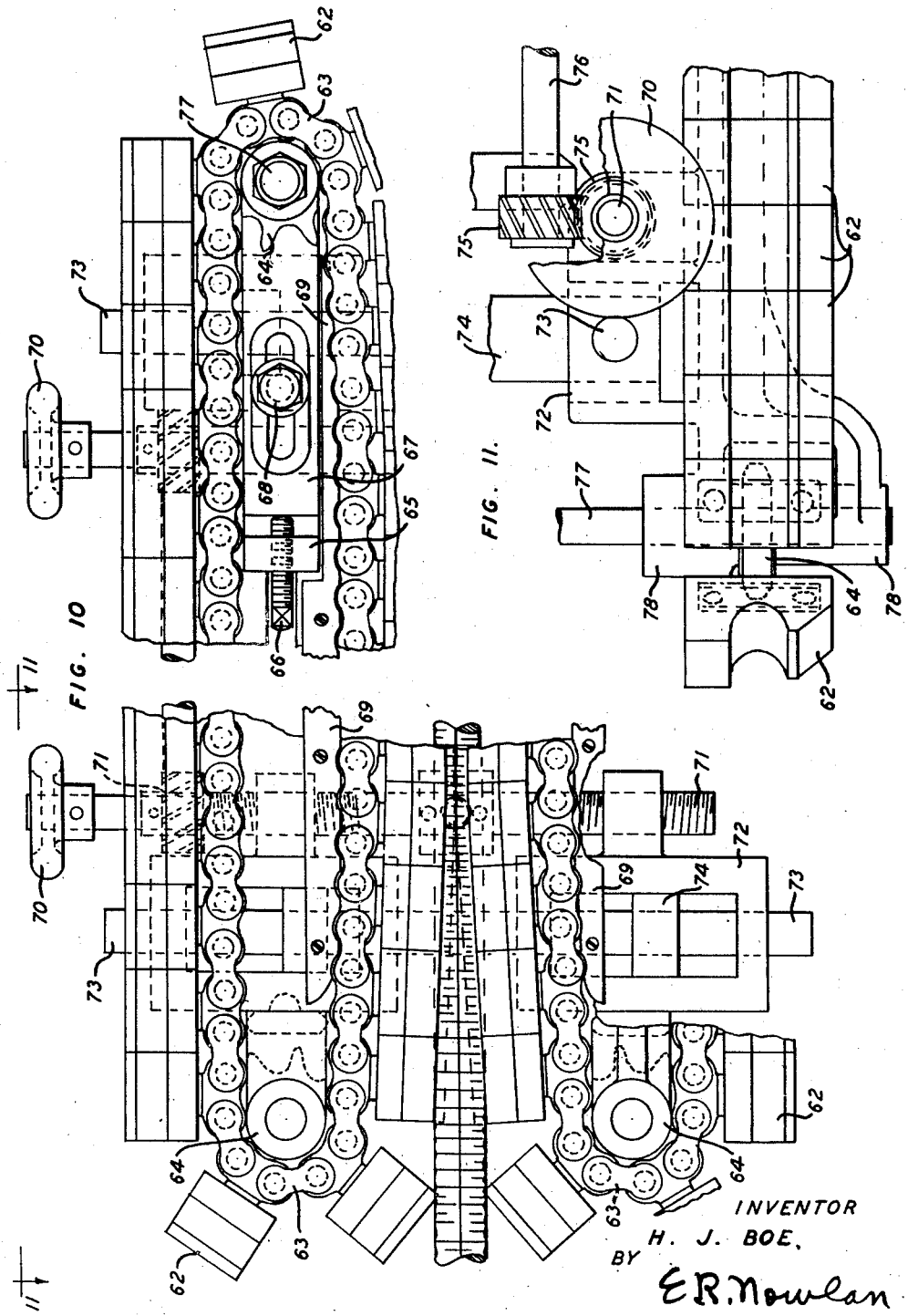
INVENTOR
H. J. BOE.
BY E.R. Nowlan
ATTORNEY

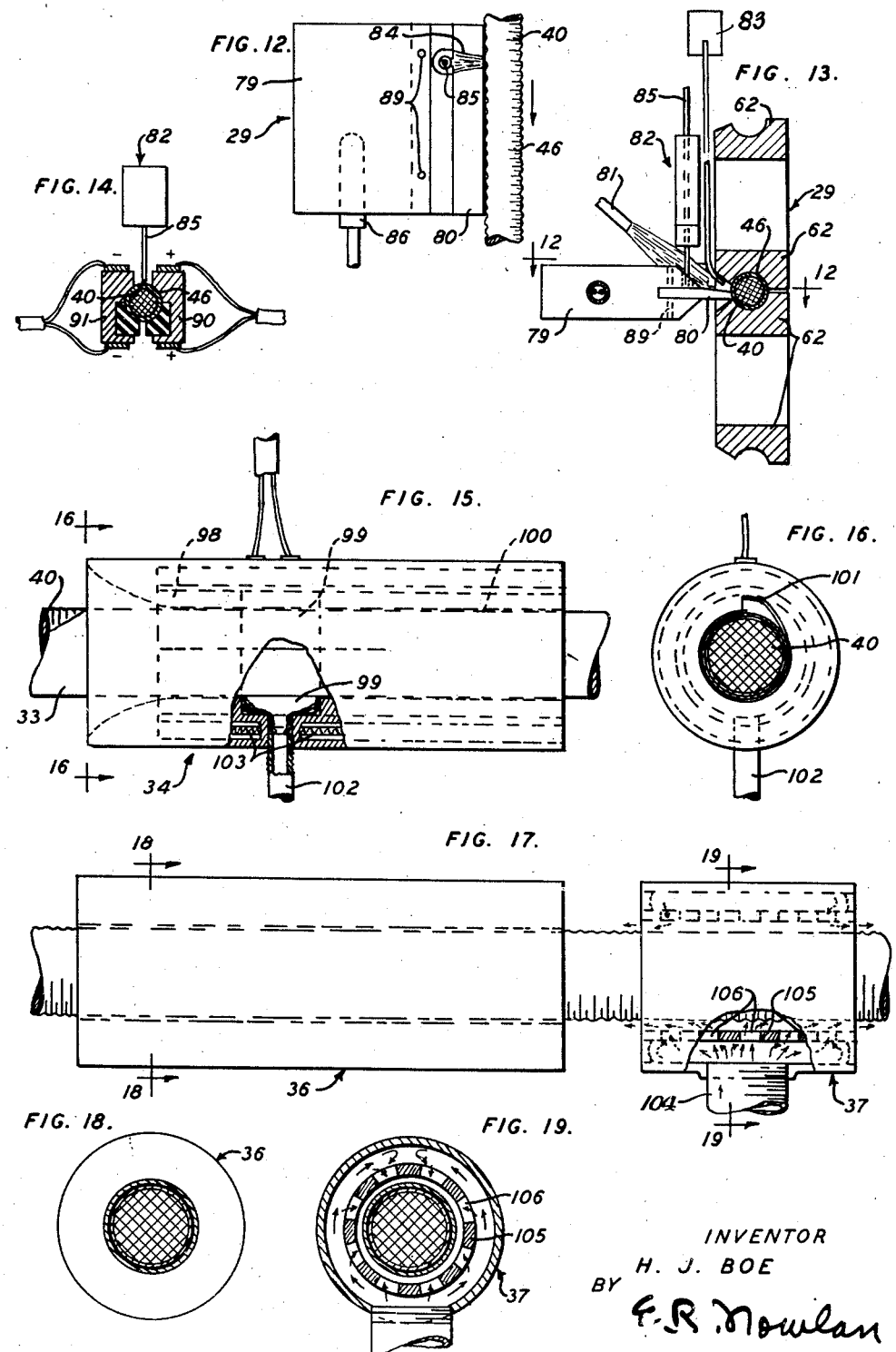

Patented Aug. 24, 1937

2,090,744

UNITED STATES PATENT OFFICE 2,090,744

METHOD OF AND APPARATUS FOR MANUFACTURING AN ELECTRICAL CABLE

Helmer J. Boe, Maplewood, N. J., assignor to Western Electric Company, Incorporated, New York, N. Y., a corporation of New York Application October 11, 1933, Serial No. 693,062

9 Claims. (Cl. 173—244)

The invention relates to a method of and apparatus for manufacturing an electrical cable and more particularly to the manufacture of cable employed in transmitting intelligence electrically.

An object of the invention is to provide an improved method of and apparatus for forming a cable.

It has been proposed, as disclosed in a copending application of Elliott P. Barrett, Serial No. 618,861, filed June 23, 1932, to construct a communication cable by forming pairs of paper insulated conductors, binding the conductors into a group, covering the group with a layer of paper applied helically, and applying a metal tape having transverse corrugations over the conductor group with the edges of the tape longitudinal to the conductor.

According to one embodiment of the invention herein illustrated and described, a flexible cable is constructed by forming pairs of paper insulated conductors, covering a group of the conductor pairs with a layer of paper, forming a metal tape having transverse corrugations over the conductor group with the edges of the tape longitudinal to the conductors, sizing the tape and securing its edges together to form a vaporproof sheath, applying a cement and a layer of an unvulcanized rubber-asphalt compound over the sheath, knitting the edges of the rubber layer together, applying a layer of flux or cement over the rubber-asphalt layer, forming, sizing and joining the edges of a second corrugated metal sheath over the rubber-asphalt layer and heating and cooling the completed cable, in a continuous process, by means of suitable apparatus.

Other objects and advantages of the invention will appear from the following detailed description when considered in connection with the accompanying drawings, in which Figs. 1 and 2, when Fig. 2 is placed to the right of Fig. 1, is an elevational view of a preferred embodiment of the apparatus;

Fig. 3 is an enlarged elevational view of the sheath forming unit shown in Fig. 1;

Fig. 4 is a plan view of the sheath forming unit shown in Fig. 3;

Figure 1:
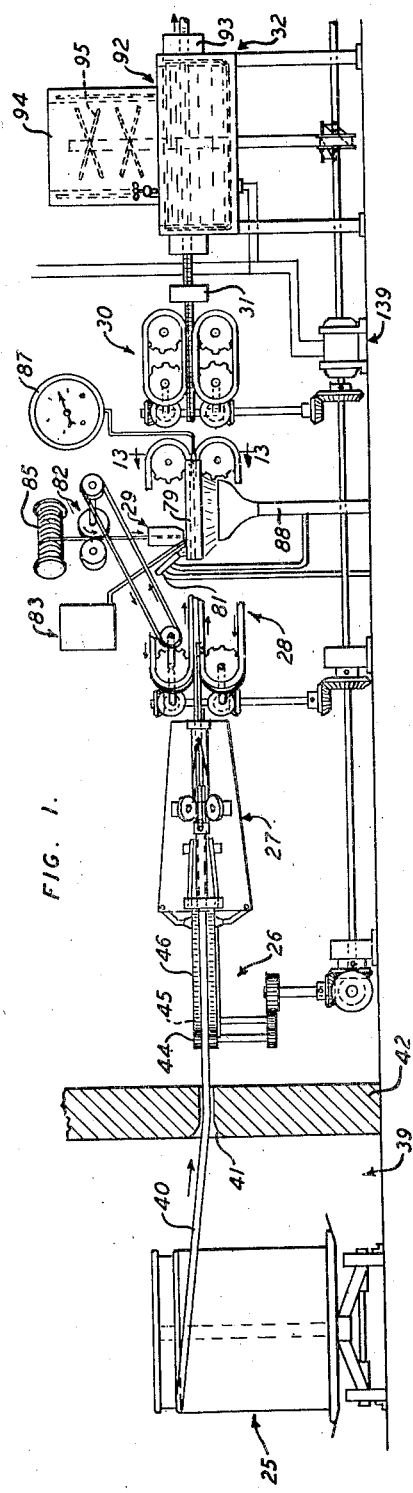
Figure 2:
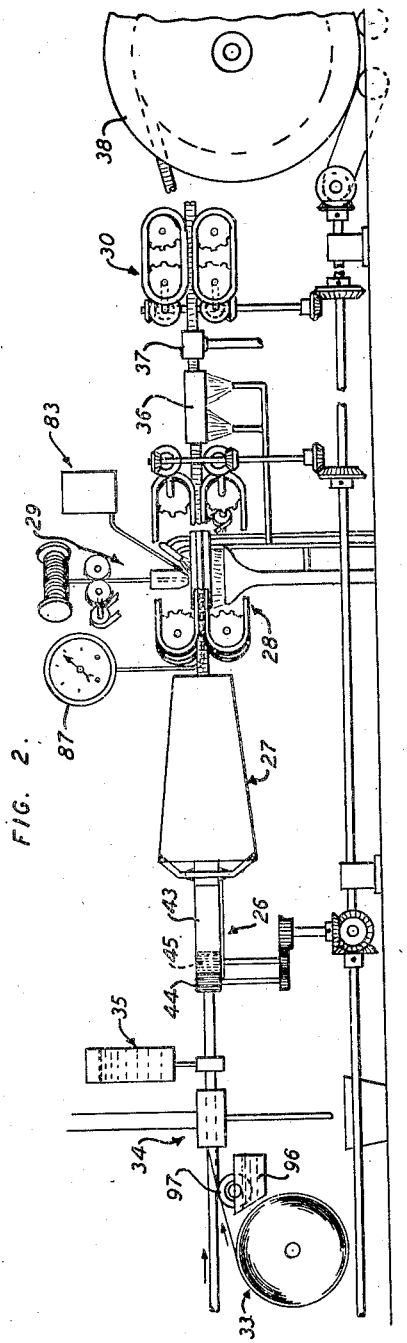

Figs. 5 to 9, inclusive, are cross-sectional views taken along the lines 5—5, 6—6, 7—7, 8—8, and 9—9, respectively, of Fig. 3;

Fig. 10 is an enlarged elevational view of the tractor sizing unit shown in Fig. 1 with a portion thereof broken away;

Fig. 11 is a partial plan view of the tractor sizing unit taken along the line 11—11 of Fig. 10;

Fig. 12 is a plan view of the sheath soldering unit taken along the line 12—12 of Fig. 13;

Fig. 13 is a sectional view of the sheath soldering unit taken along the line 13—13 of Fig. 1;

Fig. 14 is a sectional view showing an electrically heated soldering unit;

Fig. 15 is an enlarged side elevational view of the sheet rubber asphalt applicator shown in Fig. 2;

Fig. 16 is a sectional view of the applicator taken along the line 16—16 of Fig. 15;

Fig. 17 is an enlarged side elevational view taken of the cable heating unit and cable cooling unit shown in Fig. 2;

Fig. 18 is a cross-sectional view of the heating unit taken along the line 18—18 of Fig. 17, and Fig. 19 is a sectional view of the cooling unit taken along the line 19—19 of Fig. 17.

Referring to the drawings a preferred embodiment of the apparatus (Figs. 1 and 2) comprises a suitable supply 25 of paper insulated cable core, a suitable supply 26 of corrugated metallic tape, a sheath forming unit 27, a sheath sizing unit 28, a sheath soldering unit 29, a tractor capstan 30, a cable guide 31, a cement applicator 32, a supply of unvulcanized sheet rubber-asphalt compound 33, a sheet rubber applicator 34, a cement or flux applicator 35, a second supply of corrugated metallic tape 26, a second sheath forming unit 27, a second sheath sizing unit 28, a second sheath soldering unit 29, a cable heating unit 36, a cable cooling unit 37, a second tractor capstan 30 and a take-up reel 38. A motor 139, through suitable transmission elements, drives the corrugated metal supplies 26, the sheath forming units 27, the sheath sizing units 28, the sheath soldering units 29, the tractor capstans 30, the cement applicator 32 and the take-up reel 38.

The cable core supply 25 is located in a room 39 having controlled atmospheric conditions and the cable core 40 is propelled by means of the tractor capstans 30, through an aperture 41 in the wall 42 and through the sheath forming unit 27. The corrugated metallic tape supply 26 comprises a roll 43 of metallic tape such as tinned brass, copper or zinc tape, and a pair of corrugating rollers 44 and 45 through which the tape passes for the corrugating operation. The corrugated tape 46 is drawn through the sheath forming unit 27, by means of the tractor capstans 30.

Each of the sheath forming units 27 (Figs.

3 to 9, inclusive) comprises a supporting plate 47 to which is secured a pair of arms 48 which support a sheath guide 49, a rear or inner tube support 50, a pair of rider supports 51, a pair of forming roll supports 53 and a front or outer tube and seam guide and spreader support 54. A pair of sheath riders 55 is secured between the supports 50 and 51. An inner forming tube 56 having an elongated slot 57 at the front end thereof is supported by the inner tube support 50. An outer forming tube 58 is secured to the support 54. An adjustable seam guide 59 and a seam spreader 60 are also attached to the support 54. A pair of edge forming rolls 61 are secured to the roll supports 53. A top guide 52 is secured to the inner tube 56 to maintain the sheath 46 in a central position.

Each of the tractor sizing units 28 (Figs. 10 and 11) comprise sizing blocks 62 secured to a pair of endless chains 63 which are propelled by means of rotating sprockets 64. Each of the chains 63 is adjusted by means of an adjusting nut 65 and adjusting screw 66 and the adjustment is maintained by means of a sliding sprocket support 67 and a locking nut 68. The sides of the chains 63 adjacent the cable core 40 rest against chain guides 69. The distance between the chain guides 69 can be adjusted by means of hand wheels 70, threaded shafts 71, and a threaded chain assembly support 72. Guide shafts 73 and brackets 74 attached to a frame (not shown) maintain the chains 63 in proper alignment. Spiral gears 75 and connecting shafts 76 actuate the adjusting means at both ends of the chains 76 when either hand wheel 70 is rotated. Drive shafts 77 which are supported in bearings 78 are connected to the motor 139 through the transmission elements and rotate the sprockets 64 to drive the chains 63.

Each of the sheath soldering units 29 (Figs. 12 and 13) comprises a heated block 79 preferably of copper, a soldering tip 80 secured to the block by means of pins 89, a gas burner 81, a soldering material feeding arrangement 82 and a flux feeding arrangement 83. The soldering tip 80 rests against the moving sheath 46 and has a slot 84 therein into which the solder 85 is fed, and at which point it melts and flows along the tip 80. A thermocouple 86 and an indicator 87 are provided to record the temperature of the heat retaining block 79. Burners 88 (Figs. 1 and 2) are provided to supply heat to the blocks 79. A temperature of 400° F. has been found satisfactory for the blocks 79. The Bunsen burner 81 helps heat the sheath 46 and thereby facilitates soldering. When desired an electrical heated soldering arrangement such as shown in Fig. 14 can be used in place of the arrangement shown in Figs. 12 and 13. Two electrodes 90 and 91 are arranged so that the moving sheath 46 passes between them, heating the sheath 46 by means of the current flowing through the sheath from one electrode to the other to melt the solder 85 which is being fed by the arrangement 82 onto the sheath joint.

Each of the tractor capstans 30 may be of any of the types well known in the art for propelling a cable.

The cement application 32 (Fig. 1) comprises an electrically heated compound tank 92 having stuffing boxes 93 at each end thereof, through which the sheath covered cable core passes. A heated cement supply tank 94 having an agitator 95 therein is provided above the supply tank 92 for preparing the cement compound. The cement preferably has the same composition as the sheet rubber-asphalt compound 33 (Fig. 2) and is heated to a temperature at which it is in liquid form. A temperature of 300° F. has been found satisfactory for the rubber-asphalt compound referred to below.

An applicator 96 having a roller 97 is provided to apply a coating of rosin oil on one side of the unvulcanized sheet rubber-asphalt compound 33 to serve as a lubricant before it passes into the applicator 34 (Figs. 15 and 16). The sheet rubber-asphalt applicator 34 through which the metallic sheath covered cable core and the sheet rubber-asphalt compound 33 passes, comprises a rear die portion 98, a central portion 99 and a front portion 100. The rear portion 98 has a bell-mouth and is provided with an overlap guide 101 to insure that one edge of the sheet rubber-asphalt compound is always over the other edge, and a diameter such that the edges of the sheet rubber-asphalt compound are knit together. The front die portion 100 comprises a sizing die slightly smaller in diameter than the rear die portion 98. The central portion 99 is slightly larger in diameter than the front and rear portions and has an overflow 102 connected therewith so that the excess rubber compound which is scraped off the cable core by the front die portion 100 will flow out of the applicator. While electric heating elements 103 have been shown within the applicator 104, other suitable means may be provided to heat the applicator to the desired temperature. A temperature of approximately 360° F. has been found satisfactory for the particular rubber-asphalt compound disclosed.

The cement applicator 35 is designed to apply a coating of a cement or flux of rosin oil or other suitable material over the outside of the rubber-asphalt compound prior to the application of a second corrugated metallic sheath.

The cable heating unit 36 (Figs. 17 and 18) comprises a heated bushing or die of sufficient length to cause the sheet rubber-asphalt compound 33 to soften sufficiently to adhere to the inner and outer metallic sheaths 46 and, if desired, to vulcanize the compound to any desired degree. The temperature of the heating unit 36 should be at least 300° F. for the particular compound disclosed, but should not be high enough to cause the solder on the outer sheath to melt.

The cooling unit 37 (Figs. 17 and 19) comprises an inlet 104 for a cooling medium of gas or liquid and an inner wall 105 having a plurality of holes 106 therein to distribute the cooling medium around the completed cable.

If desired, one or both of the corrugated metallic sheaths can be replaced by a thin extruded lead alloy sheath or other reenforcing sheaths well known in the art, by substituting suitable apparatus for that described above for applying the corrugated metallic sheath.

The operation of the system is as follows:

The soldering units 29, the cement applicator 32, the sheet rubber-asphalt applicator 34, and the cable heating unit 36, are heated to the desired temperatures. Power is applied to the motor 139 which actuates the metallic corrugating rollers 34 and 35, the tractor sizing units 28, the solder feeding units 82, the tractor capstans 30, the agitator 95 and the take-up reel 38.

The cable core 40 is propelled from the supply 25 by means of the tractor capstans 30, through the aperture 41 in the wall 42, and through the first forming unit 27. The inner metallic sheath is propelled through the corrugating rolls 44 and 45, and through the sheath forming unit 27. The cable core 40 passes through the inner forming tube 56 and the outer forming tube 58, while the inner metallic sheath 46 passes between the outside of the forming tube 56 and the riders 55, giving a sheath contour as shown in Fig. 6. The sheath 46 then passes between the inner and outer tubes 56 and 58, and between the inner tube 56 and the edge forming rolls 61, giving the sheath the contour shown in Fig. 7. The top guide 62 (Fig. 6) maintains the sheath in a central position in the forming unit 27. As the cable core 40 and the metallic sheath 46 are propelled out of the outer forming tube 58, the seam guide 59 causes one edge of the metallic sheath to be formed under the other edge, and the seam spreader 60 maintains this condition until the cable core 40 and the metallic sheet 46 reach the tractor sizing unit 28.

As the metallic sheath covered cable core is propelled through the sizing unit 28 (Figs. 10 and 11), the moving sizing blocks 62 grip the formed sheath 46 and compress it to the proper size. The chains 63 propelled by the sprockets 64 carry the blocks 62 along and these grip the loosely sheathed cable core between them. The chain guides or cams 69 force the two chains and their blocks together thus molding the metallic sheath closely down on the cable core. While the sheath is held by the moving blocks 62 the soldering takes place. As the moving sheath 46 comes in contact with the heated elongated soldering tip 80 and to the flame from the Bunsen burner 81 (Figs. 12 and 13) the sheath is heated to soldering temperature. Solder 85 and soldering flux are automatically fed to the soldering tip 80 and adhere to the edges of the sheath 46 forming a vapor-tight covering for the cable core 40. The soldered sheath 46 is held in position by the sizing blocks 62 until the solder has set.

The chain guides or cams 69 are so formed, as is clearly shown in Fig. 10, that the grooved forming blocks 62 are applied to the formed sheath at one end of the sizing unit and removed from the sheath at the other end, substantially without effecting any rotation of the individual blocks while in contact with the sheath or except while so far separated from the sheath that the corner edges of the blocks will not indent or damage the thin and relatively delicate sheet material of the sheath.

As the sheath covered cable core is propelled through the cement in the applicator 32, a layer of heated cement, preferably of the same composition as the rubber-asphalt compound, later applied thereover in sheet form, is applied, and the excess removed as the cable passes through the front stuffing box 93.

The cable is then propelled through the heated applicator 34 (Figs. 15 and 16). An unvulcanized rubber-asphalt compound 33, in sheet form, passes over a roller 97 to coat one side of the rubber asphalt sheet with a rosin oil flux or lubricant, and then passes through the applicator 34. As the cable core and rubber-asphalt sheet pass through the applicator 34, the sheet is formed around the core, and by means of the overlap guide 101 one edge is lapped over the other. The rear die portion 98 knits the lapped edges together, the front die portion 100 irons out the lap and forms a circular cable sheath, and the central or scraping groove portion 99 removes the excess rubber-asphalt compound from the cable.

As the cable is propelled to the second forming unit 27, a coating of rosin oil flux is applied to the outside of the rubber asphalt covering. The operation of the second forming unit, tractor sizing unit, and soldering unit, is the same as above described for applying the inner corrugated metallic sheath. As the completed cable passes through the cable heating unit 36, the rubber asphalt covering and the cement, and the flux applied thereto are all heated sufficiently to unite together and to cause the rubber asphalt cover 33 to adhere to the inner and outer metallic sheaths 46. If desired, the heat and the length of the cable heating unit 36 can be such as to then cause any degree of vulcanization of the rubber-asphalt compound. The cable is then propelled through the cooling unit 37 and onto the take-up reel 38. A rubber-asphalt compound found satisfactory for the plastic insulating sheet comprises approximately 45% of a good grade of reclaimed rubber, 30% of a hard asphalt, 15% of a soft asphalt, and 10% of a filler, such as silica.

By locating the take-up 38 in the place of the cement applicator 32, there is presented an embodiment of a sub-species of the invention by which a singly armored cable is manufactured.

The metallic sheaths 46 and the insulating sheath 33 applied and formed and sealed as described are each both longitudinally and circumferentially unbroken and continuous.

While a single embodiment of the invention has been illustrated and described, it is understood that the invention is not to be limited to the particular arrangements that have been described and shown in detail, but only by the scope of the appended claims.

What is claimed is:

1. In an apparatus for combining a core and a metallic tape to form a cable and having means to apply the tape longitudinally to the core, means to form the tape into a sheath on the core comprising an inner forming tube, an outer forming tube, a pair of forming riders, a sheath centering guide, a pair of edge forming rolls, a seam guide and a seam spreader.

2. In an apparatus for combining a core and a metallic tape to form a cable and having means to apply the tape longitudinally to the core and means to form the tape into a sheath on the core, means to size the sheath comprising a pair of endless chains, power driven sprockets to support and drive the chains, sizing blocks carried by the chains to grip and compress the sheath and core therebetween and cams to coact with the blocks to force the same together the cams being so formed and disposed as to effect application of the sizing blocks to and removal thereof from the sheath substantially without rotation of the sizing blocks while in contact with the sheath, whereby the edges of the blocks are prevented from indenting the sheath.

3. In an apparatus for insulating a cable having a metallic sheath, means to supply insulating material in tape form, means to apply cement to the tape, means to apply the tape to the cable, heated means to form the tape into an insulating sheath on the cable and to join the edges of the insulating sheath comprising an elongated die having a bell-mouth entrance and a circular die portion adjacent thereto and an enlarged circular opening adjacent to the die portion and a second die portion adjacent to the enlarged opening and having a smaller diameter than the first named die portion.

4. The method of applying a protective sheath to a cable which comprises forming an inner sheath metallic sheath over the cable core, sizing the metallic sheath and joining the edges thereof to form a vapor-proof cover, applying a sheet of insulating protective material over the inner metallic sheath, forming an outer metallic sheath over the cable, sizing the outer metallic sheath and joining the edges thereof to form a second vapor-proof covering and heating the completed cable to cause the insulating protective material to adhere to the inner and outer metallic sheaths.

5. The method of applying a protective sheath to a core which comprises applying a metallic tape longitudinally to the core, forming the tape on the core as an inner metallic sheath, sizing the sheath, joining the edges thereof to form a vapor proof cover, applying a tape of vulcanizable insulating material longitudinally over the inner metallic sheath, forming and vulcanizing the insulating tape on the inner metallic sheath as an insulating sheath and thereby joining the edges of the insulating tape to form an unbroken cover adherent to the metallic sheath, applying a second metallic tape longitudinally to the insulating cover, forming the second metallic tape thereover as an outer metallic sheath therefor, and joining the edges of the second metallic tape to form a second vapor proof cover.

6. The method of applying a protective sheath to a core which comprises corrugating transversely and applying a metallic tape longitudinally to the core, forming the tape on the core as an inner metallic sheath, sizing the sheath, joining the edges thereof to form a vapor proof cover, applying a tape of vulcanizable insulating material longitudinally over the inner metallic sheath, forming and vulcanizing the insulating tape on the inner metallic sheath as an insulating sheath, and thereby joining the edges of the insulating tape to form an unbroken cover adherent to the metallic sheath, corrugating transversely and applying a second metallic tape longitudinally to the insulating cover, forming the second metallic tape thereover as an outer metallic sheath therefor, and joining the edges of the second metallic tape to form a second vapor proof cover.

7. In an apparatus for combining a core and a metallic tape to form a cable, means to supply the core, means to supply the tape, corrugating means receiving the tape from the supply thereof to precorrugate the tape transversely before the same is combined with the core, means to apply the corrugated tape longitudinally both of itself and of the core to the core and to form the tape into a tubular circumferentially corrugated sheath about the core, means for holding the tape in formed condition about the core, and means to attach the edges of the tape to each other longitudinally of the cable while the cable is held in the formed condition to prevent unwrapping of the tape and thus to form a longitudinally and circumferentially continuous metallic sheath about the core.

8. In an apparatus for combining a core and a metallic tape to form a cable, means to supply the core, means to supply the tape, a pair of coacting corrugated rollers receiving the tape from the supply thereof to precorrugate the tape transversely before the same is combined with the core, a cylindrical male guide member and a substantially cylindrical female member extending over the male member and having a substantially V-shaped slot beginning at a point spaced from the end and extending toward the end to receive the corrugated tape therebetween and to form the same into a tubular circumferentially corrugated sheath about the core, and means for advancing the cable and tape therethrough.

9. In an apparatus for combining a core and a metallic tape to form a cable, means to supply the core, means to supply the tape, a pair of coacting corrugated rollers receiving the tape from the supply thereof to precorrugate the tape transversely before the same is combined with the core, a cylindrical male guide member and a substantially cylindrical female member extending over the male member and having a substantially V-shaped slot beginning at a point spaced from the end and extending toward the end to receive the corrugated tape therebetween and to form the same into a tubular circumferentially corrugated sheath about the core, means for holding the tape in formed condition about the core, means to attach the edges of the tape to each other longitudinally of the cable while the cable is held in the formed condition to prevent unwrapping of the tape and thus to form a longitudinally and circumferentially continuous metallic sheath about the core, and means for advancing the cable therethrough.

HELMER J. BOE.